(12) United States Patent
Zhou

(10) Patent No.: US 7,389,709 B2
(45) Date of Patent: Jun. 24, 2008

(54) REVERSE TRANSFER SYSTEM BALL-SCREW, AND ELECTRO-MECHANICAL ACTUATOR EMPLOYING SAME

(75) Inventor: Xiang Zhou, Lancaster, NY (US)

(73) Assignee: Moog Inc., East Aurora, NY (US)

( * ) Notice: Subject to any disclaimer, the term of this patent is extended or adjusted under 35 U.S.C. 154(b) by 686 days.

(21) Appl. No.: 10/880,856

(22) Filed: Jun. 30, 2004

(65) Prior Publication Data
US 2006/0005645 A1 Jan. 12, 2006

(51) Int. Cl.
*F16H 1/18* (2006.01)
(52) U.S. Cl. .................... 74/424.81; 74/89.32; 74/89.34
(58) Field of Classification Search ............ 74/89.32, 74/89.34, 89.4, 424.81
See application file for complete search history.

(56) References Cited

U.S. PATENT DOCUMENTS

| | | | |
|---|---|---|---|
| 2,307,317 A * | 1/1943 | Konig | 74/89.23 |
| 2,990,157 A * | 6/1961 | McGuire | 254/29 R |
| 3,660,704 A | 5/1972 | Paine et al. | |
| 5,041,748 A | 8/1991 | Huber | |
| 5,391,953 A | 2/1995 | van de Veen | |
| 5,491,372 A | 2/1996 | Erhart | |
| 5,499,547 A * | 3/1996 | Nagai et al. | 74/89.34 |
| 5,557,154 A | 9/1996 | Erhart | |
| 6,116,106 A * | 9/2000 | Miyoshi | 74/89.37 |
| 6,857,332 B2 * | 2/2005 | Pfister | 74/89.34 |
| 2003/0167866 A1 * | 9/2003 | Durschmied | 74/89.34 |
| 2006/0005645 A1 * | 1/2006 | Zhou | 74/89.34 |

* cited by examiner

*Primary Examiner*—David M Fenstermacher
(74) *Attorney, Agent, or Firm*—Phillips Lytle LLP

(57) ABSTRACT

An electro-mechanical actuator (21) includes a reverse transfer system ball-screw (20). The actuator broadly includes a frame (22), a nut (43) mounted on the frame, at least one magnet (59) mounted on the nut, at least one coil (55) mounted on the frame, the coil being adapted to be selectively supplied with current to cause the nut to rotate within the frame, a rotary feedback device (80), and a screw (44) arranged within the nut for rotational and axial movement relative thereto. The screw and nut both have cooperative ball recesses (72, 74) that define a ball path in which a plurality of balls (73) are mounted. The ball recirculation path is provided in the screw. A rod (23) is connected to the screw for movement therewith. Relative rotation between the nut and screw will cause the screw and rod to move axially relative to the frame.

17 Claims, 3 Drawing Sheets

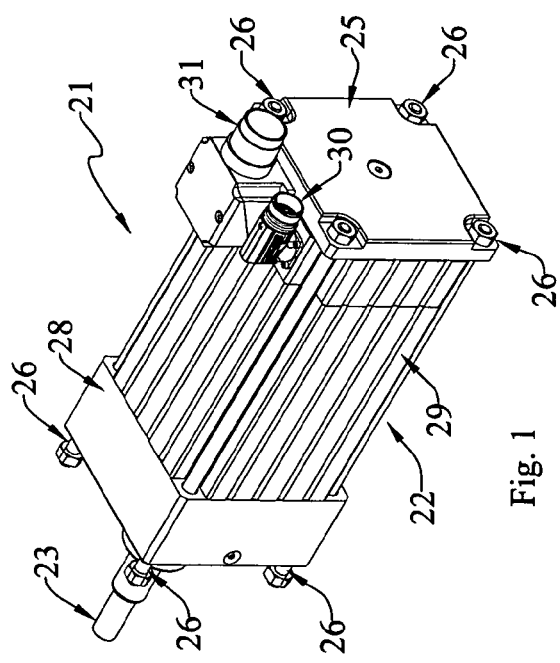
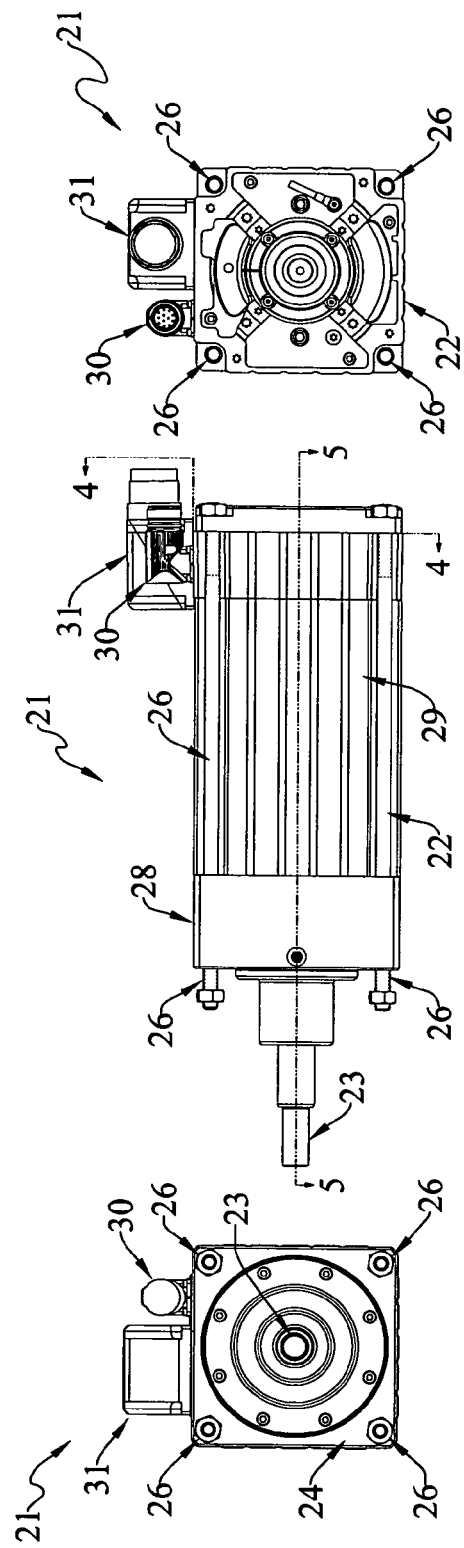

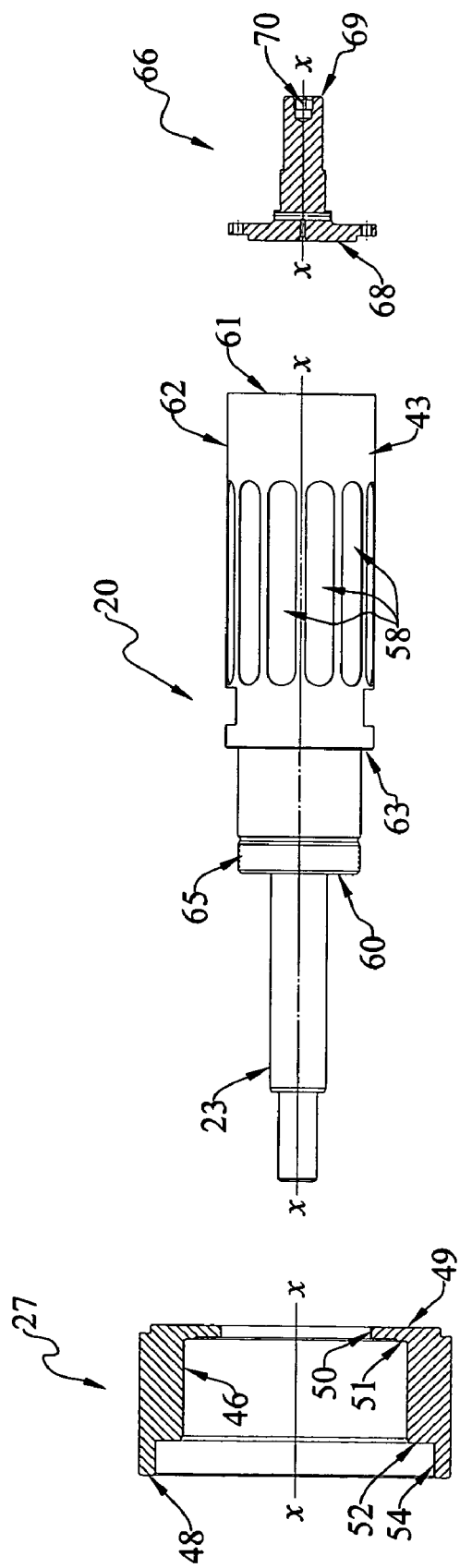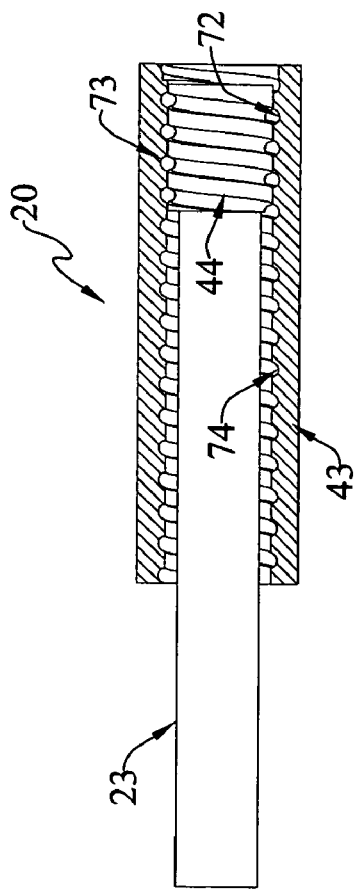

REVERSE TRANSFER SYSTEM BALL-SCREW, AND ELECTRO-MECHANICAL ACTUATOR EMPLOYING SAME

TECHNICAL FIELD

The present invention relates generally to electro mechanical actuators, and, more particularly, to improved reverse transfer system ball-screws for use in such actuators, and to improved electro mechanical actuators employing same.

BACKGROUND ART

Ball-screw assemblies are well-known, and are widely used in linear motion translation applications. Heretofore, ball recirculation paths have been built into the nut. This requires the screw to have a fully-threaded length to meet the linear translation stroke requirements. As a result of this, exposure of the threaded portion to the load will contribute to the screw becoming contaminated or damaged in a harsh working environment. This will eventually reduce service capacity and service life.

Alternatively, additional arrangements, such as an extra rod tube or a flexible cover attachment, have been used to protect the thread portion from such contamination.

The most common electrically-powered linear devices include an electric motor packaged with a linear motion device, such as a lead screw, ball-screw or planetary roller screws.

Examples of prior art actuators of this general type are representatively shown and described in U.S. Pat. Nos. 3,660,704, 5,041,748, 5,391,953, 5,491,372 and 5,557,154.

Accordingly, it would be generally desirable to provide an improved reverse transfer system ball-screw arrangement in which the screw threads are protected from unnecessary exposure to a harsh environment.

DISCLOSURE OF THE INVENTION

With parenthetical reference to the corresponding parts, portions and surfaces of the disclosed embodiment, merely for purposes of illustration and not by way of limitation, the present invention broadly provides, in one aspect, an improved reverse transfer system ball-screw (20). The improved reverse transfer system ball-screw broadly includes: a nut (43) having a cylindrical inner surface and have a ball recess (74) extending into the nut from the inner surface; a screw (44) arranged within the nut for rotational and axial movement relative thereto, the screw having a cylindrical outer surface arranged to face toward the nut inner surface and having a ball recess (72) extending into the screw from the outer surface, the nut and screw ball recesses being complimentarily configured to define an endless ball path about the screw in which balls will be continuously recirculated when the nut and screw are rotated relative to one another; a plurality of balls (73) in such ball path; and a rod (23) connected to the screw for movement therewith; whereby relative rotation between the nut and screw will cause the screw and rod to move axially relative to the nut.

In the preferred embodiment, the ball path is substantially full of spherical balls. The screw and rod may be constrained for only axial movement, and the nut may be constrained for only rotational movement. The nut may be a tubular member. A portion of the ball recess in the nut may be helical. A portion of the ball recess in the screw may also be helical.

In another aspect, the invention provides an improved electro mechanical actuator (21), which broadly includes: a frame (22); a nut (43) rotatably mounted on the frame, the nut having a cylindrical inner surface and having a ball recess (74) extending into the nut from such inner surface; at least one magnet (59) mounted on the nut; at least one coil (55) mounted on the frame, the coil being adapted to be selectively supplied with current to cause the nut to rotate within the frame; a screw (44) arranged within the nut for rotational and axial movement relative thereto, the screw having a cylindrical outer surface arranged to face toward the nut inner surface and having a ball recess (72) extending into the screw from the outer surface, the nut and screw ball recesses being complimentarily configured to define an endless ball path about the screw in which balls may be continuously recirculated when the nut and screw are rotated relative to one another; a plurality of balls (73) in the ball path; and a rod connected to the screw for movement therewith; whereby relative rotation between the nut and screw will cause the screw and rod to move axially relative to the frame, and a rotary feedback device (80) for commutating and sensing angular position of the rotating nut (43).

In the preferred embodiment, the ball path is substantially full of balls. The screw and rod may be constrained for only axial movement relative to the frame. The nut may be constrained for only rotational movement relative to the frame. Here again, the nut may be a tubular member. Portions of the ball recesses in the nut and screw may be helical. A first cushion may be arranged to act between the screw and nut at one end of the stroke of the screw. A second cushion may be arranged to act between the screw and frame at the other end of the stroke of the screw. The frame may be provided with an access opening to permit passage of a tool, such as an Allen wrench or key, by which the screw may be manually rotated relative to the frame in the event of a power failure.

Accordingly, the general object of the invention is to provide an improved reverse transfer system ball-screw.

Another object is to provide an improved electro mechanical actuator employing a reverse transfer system ball-screw.

These and other objects and advantages will become apparent from the foregoing and ongoing written specification, the drawings, and the appended claims.

BRIEF DESCRIPTION OF THE DRAWINGS

FIG. 1 is a perspective view of an improved electro mechanical actuator employing an improved reverse transfer system ball-screw.

FIG. 2 is a side elevation of the actuator shown in FIG. 1.

FIG. 3 is a left end elevation of the actuator shown in FIG. 2.

FIG. 4 is a fragmentary transverse vertical sectional view thereof, taken generally on line 4-4 of FIG. 2, this view showing a right end elevation with the right end cap removed.

FIG. 6 is a reduced-scale horizontal longitudinal sectional view of the bearing cover shown in FIG. 5.

FIG. 7 is a reduced-scale detail view of the reverse transfer system ball-screw, this view showing a top plan view of the nut.

FIG. 8 is a schematic longitudinal sectional view of the reverse transfer system ball-screw.

FIG. 9 is a reduced-scale longitudinal sectional view of the resolver shaft, this view being taken generally on line 9-9 of FIG. 5.

DESCRIPTION OF THE PREFERRED EMBODIMENTS

Figure 5:
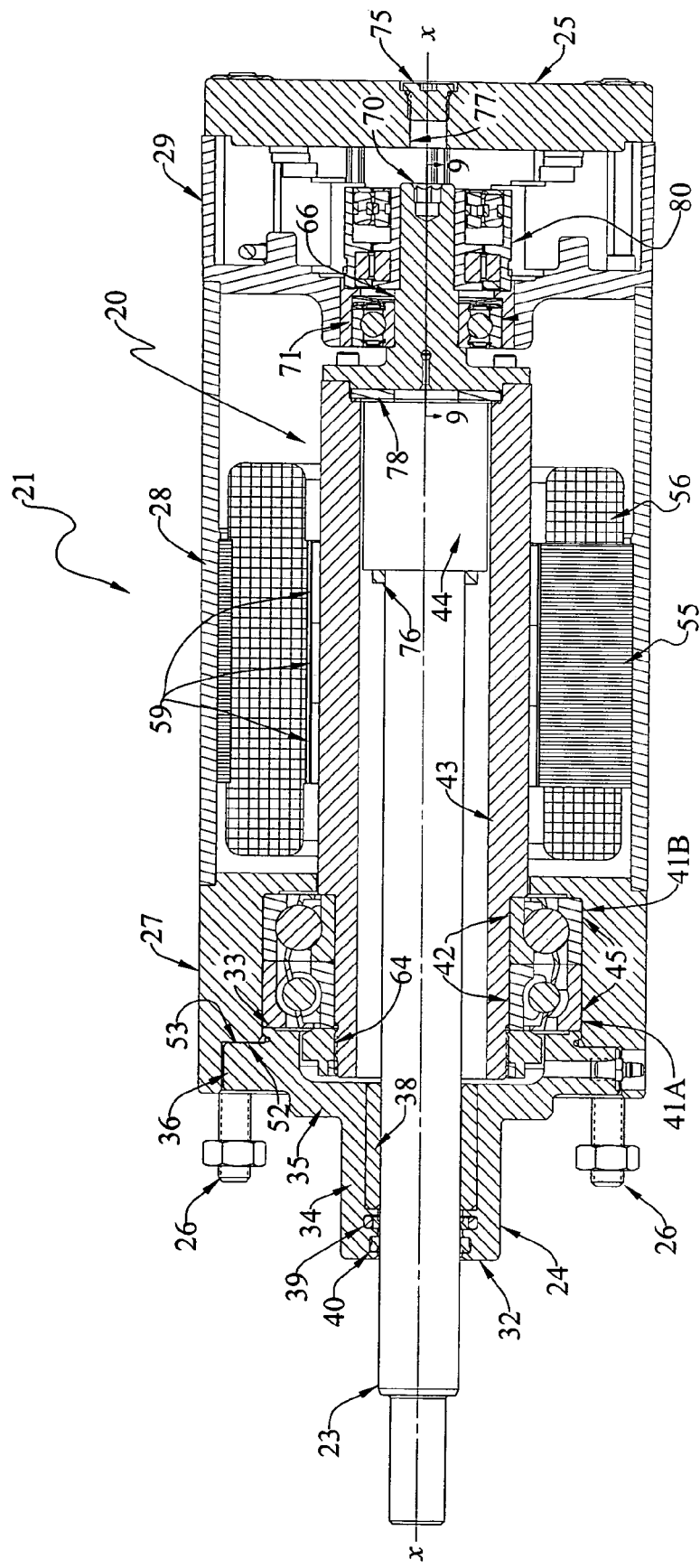
FIG. 5 is an enlarged fragmentary longitudinal horizontal sectional view of the improved actuator, this view being taken generally on line 5-5 of FIG. 2.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIGS. 1-5 thereof, the present invention broadly provides an improved reverse transfer system ball-screw, of which the presently-preferred embodiment is generally indicated at 20, and an improved actuator, generally indicated at 21 incorporating the improved reverse transfer system ball-screw.

In FIG. 1, actuator 21 is shown as being a horizontally-elongated generally rectangular package having a frame, collectively indicated at 22, and having a rod 23 extending outwardly from its left end that is arranged for reciprocating horizontal movement relative to the frame. The frame is shown as having a left end cap 24 and a right end cap 25, and is held together by means of four tie-rods, severally indicated at 26, arranged adjacent the four longitudinal corners of the frame. These tie-rods compress the two end caps 24, 25 against an intermediate bearing cover 27, an intermediate rectangular wall portion 28, and a rightward housing or rotary feedback device 29. A pair of electrical connectors, indicated at 30 and 31, respectively, are mounted on the frame. These connectors provide an appropriate means or mechanism by which electrical signals may be supplied to and/or from the coil and resolver, as described herein.

As best shown in FIG. 5, left end cap 24 is a horizontally-elongated specially-configured member having an annular vertical left end face 32, and an annular vertical right end face 33. The left end cap appears to have a central portion 34 that is drawn more deeply than an intermediate portion 35, which in turn, appears to be drawn from an outer flange portion 36. Thus, the left end cap appears to have two series-connected cup-shaped portions extending leftwardly from a flange. A composite cylindrical bearing, indicated at 38, is operatively arranged within portion 34 and encircles an intermediate portion of rod 23. This bearing may be made of Rulon CJE composite material, which is available from Furon, 386 Metacom Avenue, Bristol, R.I. 02809.

A step seal 39 and a scraper 40 are operatively recessed within left end cap portion 34 to engage the penetrant portion of the rod passing therebetween.

Two axially-stacked leftward bearings, 41A, 41B, surround the reverse transfer system ball-screw. More particularly, these two bearings have their inner races 42 operatively arranged to engage the nut 43 surrounding the screw 44, and have their outer races 45 arranged to engage an inwardly-facing cylindrical surface 46 of bearing cover 27. As best shown in FIG. 6, bearing cover 27 is a horizontally-elongated specially-configured member having an annular vertical left end face 48, an annular vertical right end face 49, an inwardly-facing horizontal cylindrical surface 50 extending leftwardly from the inner margin of right end face 49, a leftwardly-facing annular vertical surface 51 arranged to bear against the outer races of the bearings, an inwardly-facing horizontal cylindrical surface 46, a leftwardly-facing annular vertical surface 52 arranged to bear against the rightwardly-facing annular vertical surface 53 of the left end cap, and an inwardly-facing horizontal cylindrical surface 54 continuing leftwardly therefrom to join the inner margin of left end face 48.

Frame part 28 is shown as being in a form of a rectangular tube, having a plurality of flutes on its outer surface. The left end face of member 28 is received in a corner notch extending into the bearing cover from its right end face.

Adverting now to FIG. 5, a plurality of coils 55 are wound around a corresponding plurality of bobbins 56, and are mounted on the inner surface of member 28 so as to surround the reverse transfer system ball-screw 20.

As best shown in FIG. 7, the reverse transfer system ball-screw includes a nut 43 having a plurality of circumferentially-spaced grooves, severally indicated at 58 for receiving and holding a plurality of magnets, severally indicated at 59 (FIG. 5). The nut is shown as having an annular vertical left end face 60, an annular vertical right end face 61, and an outwardly-facing horizontal cylindrical surface 62. Flutes 58 extend into nut 43 from surface 62. The nut is also shown as having a leftwardly-facing annular vertical surface 63, which is arranged to bear against the inner race of bearings 41A, 41B. As best shown in FIG. 5, a self-locking nut 64 is threaded onto an externally-threaded portion 65 of the nut, and bears against the left end face of the stacked bearing inner races. Thus, nut 64 may be selectively tightened to bear against the inner races of the bearings. As previously indicated, the right end face of the bearing inner races bear against nut surface 63.

As best shown in FIG. 9, a feedback shaft, generally indicated at 66, is adapted to be attached by fasteners to the left marginal end of the nut. This feedback shaft is shown as being a horizontally-elongated specially-configured member, and has, in pertinent part an annular vertical left end face 68, and an annular vertical right end face 69. A hole 70 is provided into the feedback shaft from its right end face 69. This hole is provided with an internal hex thread, which is adapted to receive an Allen key (not shown). Hence, an Allen key may be used to rotate the nut manually in the event of a power failure. The feedback shaft 66 is shown as being rotatably journalled on body part 29 by means of a bearing 71.

Referring now to FIG. 8, the reverse transfer system ball-screw 20 is schematically indicated as including a nut 43, a screw 44, and a rod 23 that penetrates the nut and engages the screw. The nut and screw are shown as severally including ball recesses, 74, 72, respectively. These ball recesses, portions of which are shown as being helically wound in the appropriate structure, are complimentarily configured to define an endless ball path about the screws in which balls may be continuously recirculated when the ball and screw are rotated relative to one another. This ball path is substantially filled with balls, one of which is indicated at 73, and the balls recirculate about the screw. In the preferred embodiment, the rod and screw are mounted for axial, but not rotative, movement relative to the frame, and the nut is mounted on the frame for rotation about the screw. Hence, appropriate current may be supplied to the coils, to rotate the nut about the screw. This translates the screw and rod axially relative to the frame.

The apparatus also includes a rotary position feedback device 80, which is mounted inside the feedback housing as shown in FIG. 5. The rotary feedback device (80) is arranged to sense the angular position of the rotating nut (43) for position feedback and commutation.

The right end cap 25 is shown as having an axial hole 77 which is shown as being occluded by a removable plug 75. In use, plug 75 may be removed to allow access through hole 77 to hexagonal hole 70 in the resolver shaft.

A cushion stop 76 is mounted on left end face of the screw and surrounds a portion of the rod. This cushion stop is arranged to move with the screw, and is arranged to cushion decelerating movement of the screw at the leftward end of its stroke. Similarly, an opposite cushion stop 78, which somewhat resembles a flat washer, is mounted on the left end face of the resolver nut, to cushion and decelerate the screw at the right end of its stroke.

Therefore, the present invention broadly provides an improved reverse transfer system ball-screw, which broadly includes: a nut having a cylindrical inner surface and having a ball recess extending into the nut from such inner surface; a screw arranged within the nut for rotational and axial movement relative thereto, the screw having a cylindrical outer surface arranged to face toward the nut inner surface and having a ball recess extending into the screw from such outer surface, the nut and screw ball recesses being complimentarily configured to define an endless ball path about the screw in which the balls may be continuously recirculated when the nut and screw are rotated relative to one another; a plurality of balls in the ball path; and a rod connected to the screw for movement therewith; such that relative rotation between the nut and screw will cause the screw and rod to move axially relative to the nut.

At the same time, the invention also provides an improved electro-mechanical actuator, which broadly includes: a frame; a nut rotatably mounted on the frame, the nut having a cylindrical inner surface and having a ball recess extending into the nut from such inner surface; at least one magnet mounted on the nut; at least one coil mounted on the frame, the coil being adapted to be selectively supplied with current to cause the nut to rotate within the frame; a screw arranged within the nut for rotational and axial movement relative thereto, the screw having a cylindrical outer surface arranged to face toward the nut inner surface and having a ball recess extending into the screw from its outer surface; the nut and screw ball recesses being complimentarily configured to define an endless ball path about the screw in which the balls may be continuously recirculated when the nut and screw are rotated relative to one another; a plurality of balls in the ball path; and a rod connected to the screw for movement therewith; whereby relative rotation between the nut and screw will cause the screw and rod to move axially relative to the frame.

Modifications

The present invention contemplates that many changes and modifications may be made. For example, the shape and configuration of the various parts and components may be readily changed or varied, as desired. The materials of construction are not deemed to be particularly critical, and may be varied. The device may have one or more coils and one or more magnets mounted on the nut. Similarly, the apparatus may be held together by means other then the tie-rods shown.

Therefore, while the presently-preferred form of the improved reverse transfer system ball-screw and actuator containing same have been shown and described, and several modifications thereof discussed, persons skilled in this art will readily appreciate that various additional changes and modifications may be made without departing from the spirit of the invention, as defined and differentiated by the following claims.

What is claimed is:

1. A reverse transfer system ball-screw, comprising:
   a nut having a cylindrical inner surface and having a ball recess extending into said nut from said inner surface;
   a screw arranged within said nut for rotational and axial movement relative thereto, said screw having a cylindrical outer surface arranged to face toward said nut inner surface and having a ball recess extending into said screw from said outer surface, said nut and screw ball recesses being complimentarily configured to define an endless ball path about said screw in which balls will be continuously recirculated when said nut and screw are rotated relative to one another;
   a plurality of balls in said ball path; and
   a rod connected to said screw for movement therewith;
   whereby relative rotation between said nut and screw will cause said screw and rod to move axially relative to said nut.

2. A reverse transfer system ball-screw as set forth in claim 1 wherein said ball path is substantially full of said balls.

3. A reverse transfer system ball-screw as set forth in claim 1 wherein said screw and rod are constrained for only axial movement.

4. A reverse transfer system ball-screw as set forth in claim 3 wherein said nut is constrained for only rotational movement.

5. A reverse transfer system ball-screw as set forth in claim 1 wherein said nut is a tubular member.

6. A reverse transfer system ball-screw as set forth in claim 1 wherein a portion of said ball recess in said nut is helical.

7. A reverse transfer system ball-screw as set forth in claim 1 wherein a portion of said ball recess in said screw is helical.

8. An electro-mechanical actuator, comprising:
   a frame;
   a nut rotatably mounted on said frame, said nut having a cylindrical inner surface and having a ball recess extending into said nut from said inner surface;
   at least one magnet mounted on said nut;
   at least one coil mounted on said frame, said coil being adapted to be supplied with current to cause said nut to rotate within said frame
   a screw arranged within said nut for rotational and axial movement relative thereto, said screw having a cylindrical outer surface arranged to face toward said nut inner surface and having a ball recess extending into said screw from said outer surface, said nut and screw ball recesses being complimentarily configured to define an endless ball path about said screw in which balls will be continuously recirculated when said nut and screw are rotated relative to one another;
   a plurality of balls in said ball path; and
   a rod connected to said screw for movement therewith;
   whereby relative rotation between said nut and screw will cause said screw and rod to move axially relative to said frame.

9. An electro-mechanical actuator as set forth in claim 8 wherein said ball path is substantially full of said balls.

10. An electro-mechanical actuator as set forth in claim 8 wherein said screw and rod are constrained for only axial movement relative to said frame.

11. An electro-mechanical actuator as set forth in claim 8 wherein said nut is constrained for only rotational movement relative to said frame.

12. An electro-mechanical actuator as set forth in claim 8 wherein said nut is a tubular member.

13. An electro-mechanical actuator as set forth in claim 8 wherein a portion of said ball recess in said nut is helical.

14. An electro-mechanical actuator as set forth in claim 8 wherein a portion of said ball recess in said screw is helical.

15. An electro-mechanical actuator as set forth in claim 8 and further comprising a first cushion arranged to act between said screw and nut at one end of the stroke of said screw.

16. An electro-mechanical actuator as set forth in claim 15 and further comprising a second cushion arranged to act between said screw and frame at the other end of the stroke of said screw.

17. An electro-mechanical actuator as set forth in claim 8 wherein said frame is provided with an access opening to permit passage of a tool by which said screw may be manually rotated relative to said frame.

* * * * *